US007970749B2

(12) United States Patent
Uhlir et al.

(10) Patent No.: US 7,970,749 B2
(45) Date of Patent: Jun. 28, 2011

(54) METHOD AND SYSTEM FOR USING GEOGRAPHIC DATA IN COMPUTER GAME DEVELOPMENT

(75) Inventors: Kurt Brooks Uhlir, Chicago, IL (US); Christopher Dougherty, Highland Park, IL (US); Michael V. Shuman, Chicago, IL (US); Roy Casino, Mundelein, IL (US)

(73) Assignee: NAVTEQ North America, LLC, Chicago, IL (US)

( * ) Notice: Subject to any disclaimer, the term of this patent is extended or adjusted under 35 U.S.C. 154(b) by 333 days.

(21) Appl. No.: 10/798,459

(22) Filed: Mar. 11, 2004

(65) Prior Publication Data
US 2005/0203922 A1  Sep. 15, 2005

(51) Int. Cl.
*G06F 17/30* (2006.01)
(52) U.S. Cl. .......................................... 707/705; 707/919
(58) Field of Classification Search .................. 707/705, 707/919, 999.102
See application file for complete search history.

(56) References Cited

U.S. PATENT DOCUMENTS

| 2,026,082 | A |   | 12/1935 | Darrow | 273/134 |
| 4,097,051 | A | * | 6/1978 | Goldberg et al. | 273/254 |
| 4,645,459 | A |   | 2/1987 | Graf et al. | 434/43 |
| 5,184,956 | A |   | 2/1993 | Langlais et al. | 434/69 |
| 5,526,479 | A |   | 6/1996 | Barstow et al. | 395/152 |
| 5,566,073 | A |   | 10/1996 | Margolin | 701/231 |
| 5,573,402 | A |   | 11/1996 | Gray | 434/69 |
| 5,616,079 | A | * | 4/1997 | Iwase et al. | 463/32 |
| 5,618,043 | A | * | 4/1997 | McGlew | 273/308 |
| 5,651,676 | A |   | 7/1997 | Artwick | 434/43 |
| 5,660,547 | A |   | 8/1997 | Copperman | 434/29 |
| 5,823,780 | A |   | 10/1998 | Arye et al. | 434/38 |
| 5,945,985 | A | * | 8/1999 | Babin et al. | 715/209 |
| 6,023,278 | A |   | 2/2000 | Margolin | 345/419 |
| 6,146,143 | A | * | 11/2000 | Huston et al. | 434/69 |
| 6,171,186 | B1 |  | 1/2001 | Kurosawa et al. | 463/31 |
| 6,173,277 | B1 |  | 1/2001 | Ashby et al. |  |
| 6,183,364 | B1 | * | 2/2001 | Trovato | 463/32 |

(Continued)

FOREIGN PATENT DOCUMENTS

EP       1 107 189       6/2001

(Continued)

OTHER PUBLICATIONS

Koller et al., "Virtual GIS: A Real-Time 3D Geographic Information System", Proceedings of the 6th IEEE Visualization Conference, IEEE: 1995, pp. 94-100.*

(Continued)

*Primary Examiner* — Hung T Vy
*Assistant Examiner* — Phuong-Thao Cao
(74) *Attorney, Agent, or Firm* — Adil M. Musabji; Frank J. Kozak; Jon D. Shutter (57) ABSTRACT

A system and method are disclosed for facilitating development of computer games that depict or represent actual, real world geographic areas as part of the play scenarios of the games. A source database contains data that represent geographic features in a region including roads in the region. The data in the source database includes attributes suitable for use for providing navigation-related functions. In addition to providing data from the source database for navigation-related functions, data from the source database are also provided for computer game development. An application programming interface, as well as other tools for handling geographic data, is provided for accessing and processing of the geographic data.

28 Claims, 7 Drawing Sheets

U.S. PATENT DOCUMENTS

| | | | | |
|---|---|---|---|---|
| 6,183,634 | B1 | 2/2001 | Du Toit et al. | 201/94 |
| 6,266,614 | B1* | 7/2001 | Alumbaugh | 701/211 |
| 6,268,858 | B1 | 7/2001 | Nathman et al. | 345/419 |
| 6,289,276 | B1* | 9/2001 | Ahrens et al. | 701/200 |
| 6,343,301 | B1* | 1/2002 | Halt et al. | 1/1 |
| 6,362,817 | B1 | 3/2002 | Powers et al. | 345/419 |
| 6,401,033 | B1* | 6/2002 | Paulauskas et al. | 701/207 |
| 6,489,963 | B2 | 12/2002 | Parikh et al. | 345/522 |
| 6,509,869 | B2 | 1/2003 | Aoyama | 342/357.13 |
| 6,612,925 | B1* | 9/2003 | Forsberg | 463/6 |
| 6,677,858 | B1 | 1/2004 | Faris et al. | 340/573.1 |
| 6,772,142 | B1* | 8/2004 | Kelling et al. | 1/1 |
| 6,961,055 | B2 | 11/2005 | Doak et al. | 345/419 |
| 7,038,694 | B1 | 5/2006 | Santodomingo et al. | 345/582 |
| 7,570,261 | B1* | 8/2009 | Edecker et al. | 345/420 |
| 2001/0034661 | A1* | 10/2001 | Ferreira | 705/26 |
| 2002/0063654 | A1 | 5/2002 | Aoyama | 342/357.13 |
| 2002/0091005 | A1* | 7/2002 | Shoji et al. | 472/65 |
| 2002/0187831 | A1 | 12/2002 | Arikawa et al. | 463/32 |
| 2002/0198694 | A1* | 12/2002 | Yang et al. | 703/6 |
| 2003/0059743 | A1* | 3/2003 | Lechner | 434/43 |
| 2003/0195023 | A1 | 10/2003 | Di Cesare | 463/9 |
| 2003/0214530 | A1* | 11/2003 | Wang et al. | 345/757 |
| 2003/0215110 | A1 | 11/2003 | Rhoads et al. | 382/100 |
| 2004/0078263 | A1* | 4/2004 | Altieri | 705/14 |
| 2004/0153557 | A1* | 8/2004 | Shochet et al. | 709/229 |
| 2004/0176936 | A1 | 9/2004 | Ohtsu et al. | |
| 2004/0236543 | A1* | 11/2004 | Stephens | 703/1 |
| 2005/0159216 | A1* | 7/2005 | Chiu et al. | 463/31 |

FOREIGN PATENT DOCUMENTS

| | | |
|---|---|---|
| JP | 06202557 A | 7/1994 |
| JP | 11-057209 * | 3/1999 |
| JP | 2003-000940 | 1/2003 |
| JP | 2003-023357 | 1/2003 |
| JP | 2003-329449 | 11/2003 |
| WO | WO 02/26518 A1 | 4/2002 |
| WO | WO 02/39363 A1 | 5/2002 |

OTHER PUBLICATIONS

"World Construction Set or Visual Nature Studio", http://web.archive.org/web/20031206133238/http://www.3dnature.com/comparingfeatures.html, Dec. 2003, pp. 1-6.*

Freedman, Jonah, Map Quests, XP002335320, http://www.wired.com/wired/archive/12.02/play_pr.html, Feb. 2004, p. 1.*

Koller et al., "Virtual GIS: A Real-Time 3D Geographic Information System", IEEE, Proceedings of the 6th Visualization Conference, 1995, pp. 94-100 (Provided by Applicant).*

Freedman, Jonah, Map Quests, XP-002335320, Feb. 2004, p. 1 (Provided by Applicant).*

Game Information of True Crime: Streets of L.A., release date Aug. 1, 2003, p. 1-2, Accessed on line at <http://www.xbox.com/en-US/games/t/truecrimestreetsofla/> on Oct. 9, 2007.*

Stephen M. Ervin, "Lanscape Visualization with Emaps", IEEE, 1993, pp. 28-33, accessed online at <http://ieeexplore.ieee.org/stamp/stamp.jsp?tp=&arnumber=204963> on Apr. 15, 2009.*

William Cartwright, "Metaphor and Gaming and Access to Spatial Information", paper for 4th E-Mail Seminar on Cartography on Cartography 2001 "Cartographic Education", pp. 1-7, accessed online at <www.uacg.bg/UACEG_site/sem_geo/William%20Cartwright.doc> on Apr. 15, 2009.*

Streets of SimCity, Wikipedia reference, 6 pages, retrieved on Jun. 16, 2009 at <http://en.wikipedia.org/wiki/Streets_of_SimCity> (provided by Applicant on Jul. 21, 2009).*

Quick, After Him: Pac-Man WentThataway, The New York Times, Section 9-Sunday Styles, pp. 1 and 11. (May 9, 2004).

Pac Manhattan, http://pacmanhattan.com/yourcity.php, pp. 1-3, (2004).

Map Quests, WIRED, p. 052 (Feb. 2004).

*Microsoft Flight Simulator 2002 Software Development Kit*; Autogen, XP002335786, pp. 4, 6-8, http://microsoft.com/games/flightsimulator/fs2002_download_sdk.asp#scenery>; Apr. 2002.

Muller, Chris; Denney, Eddie; *AVSIM Commercial Scenery Review*; Real Scene U.S. Terrain Mesh Scenery for FS2002; XP002335787, entire document; http://www.avsim.com/pages/0402/realscene_terrainmesh/rs_us_tms.html; Apr. 2002.

Klaus, Todd; Terra Scene V2.0, TerraScene Scenery Generation System—Tutorials and Reference Guide; XP002335169, pp. 1-63; http://library.avsim.net/sendfile.php?; Apr. 2004.

Cable, Tim; Klaus, Todd; *AVSIM Freeware Utility Review*, Terra Scene, XP002335170, entire document, http://avsim.com/pages/0500/terrascene/terrascene.shtml> May 2000.

*3D Nature*: "What is Visual Nature Studio" EP002335442, entire document http://web/archive.org/web/20040202220153; http://wwww.3dnature.com/vnsinfo.html>, Feb. 2004.

Freedman, Jonah, *Map Quests*, XP002335320, 1 page, http://www.wired.com/wired/archive/12.02/play_pr.html> Feb. 2004.

3D Nature PLC, Ltd.; "Comparison of features" *World Construction Set, Visual Nature Studio*, 'Online!', XP002335684, http://web.archive.org/web/20031206133238/http://www.3dnature.com/comparingfeatures.html>, entire document (Dec. 2003).

Koller et al., "Virtual GIS: A Real-Time 3D Geographic Information System", *Proceedings of 6th IEEE Visualization Conference*, XP002335667, pp. 94-100 (Oct. 1995).

SimCity 2000 User's Manual (for Super Nintendo), 1996.

SimCopter User's Manual, 1996.

Photography of side of SimCity200 box, 1993.

SimCity 2000 User's Manual (for PC), 1993.

Microsoft Flight Simulator 2004, A Century of Flight, Sybex Official Strategies & Secrets (2003).

www.mapquest.com. 1 page: 1997. http://web.archive.org/web/19970410221743/http://www.mapquest.com/.

Wikipedia reference. 6 pages, retrieved on Jun. 16, 2009. http://en.wikipedia.org/wiki/Streets_of_SimCity.

* cited by examiner

METHOD AND SYSTEM FOR USING GEOGRAPHIC DATA IN COMPUTER GAME DEVELOPMENT

REFERENCE TO RELATED APPLICATIONS

The present application is related to the patent applications entitled "APPLICATION PROGRAMMING INTERFACE FOR GEOGRAPHIC DATA IN COMPUTER GAMES", application Ser. No. 10/798,531 filed Mar. 11, 2004 (now U.S. Pat. No. 7,828,655), "GEOGRAPHIC AREA TEMPLATES FOR COMPUTER GAMES", application Ser. No. 10/798,632 filed Mar. 11, 2004, and "COMPUTER GAME DEVELOPMENT FACTORY SYSTEM AND METHOD", application Ser. No. 10/798,703 filed Mar. 11, 2004, the entire disclosures of which are incorporated by reference herein.

BACKGROUND OF THE INVENTION

The present invention relates to a system and method that facilitate development of computer games and more particularly, a system and method that facilitate development of computer games that include representations of actual real world geographic areas, such as the road networks in the geographic areas.

Computer games have developed in sophistication and commercial importance. Improvements in computer hardware and software have enabled computer games to provide realistic graphics and sound. With these advances, computer game users have come to expect that games meet high standards for richness and attention to detail. For computer games that are intended to represent real world places, such as road race games, users expect the games to provide convincing depictions of the real world, with attention to accuracy and detail.

Computer game developers have recognized the need to provide realistic depictions of actual real world places in computer games. This has placed a burden on computer game developers to obtain the data needed to portray geographic places with realistic detail and accuracy. The collection of such detailed geographic data about real world roads, places, etc., is time-consuming and expensive. Further, the collection of detailed real world data diverts the resources of computer game developers away from other important aspects of computer game creation, such as characters, story lines, and strategies. Thus, there exists a need to facilitate the collection and use of geographic data by game developers.

Another consideration related to the development of computer games that depict real world places relates to providing a variety of different locales. Even if a computer game developer collects all the data needed to depict a particular real world locale (such as a city) with the richness and detail expected by game players, the game play scenario is limited to only that particular locale. This may limit the appeal of the computer game. Therefore, it may be advantageous for a computer game developer to provide games that depict a variety of different real world locales. However, if a computer game developer wants to provide a game with different real world locales, the developer is required to collect geographic data for each different locale, thus incurring further considerable expense.

Accordingly, it is an objective to provide a way to make computer games that represent actual physical places.

It is another objective to facilitate the representation of actual physical places in a computer game.

SUMMARY OF THE INVENTION

To address these and other objectives, the present invention includes a system and method for facilitating development of computer games that depict or represent actual, real world (or imaginary) geographic areas as part of the play scenarios of the games. A source database contains data that represent geographic features in a region including roads in the region. The data in the source database includes attributes suitable for use for providing navigation-related functions. In addition to providing data from the source database for navigation-related functions, data from the source database are also provided for computer game development. An application programming interface, as well as other tools for handling geographic data, is provided for accessing and processing of the geographic data.

DETAILED DESCRIPTION OF THE PRESENTLY PREFERRED EMBODIMENTS

I. Introduction

The embodiments disclosed herein relate to computer games that depict real geographic locales as part of the play scenarios of the computer games. For example, the play scenarios may involve a car chase through the streets of Miami, Fla., a treasure hunt through Europe, a flight simulator game over Texas, and so on. In the embodiments disclosed herein, geographic data used in the computer games is obtained from a map data developer. In these embodiments, the map data developer collects, confirms, updates, processes and distributes geographic data for other, non-game related purposes, such as the provision of geographic data for navigation-related purposes.

I. Source Geographic Database

Figure 1:
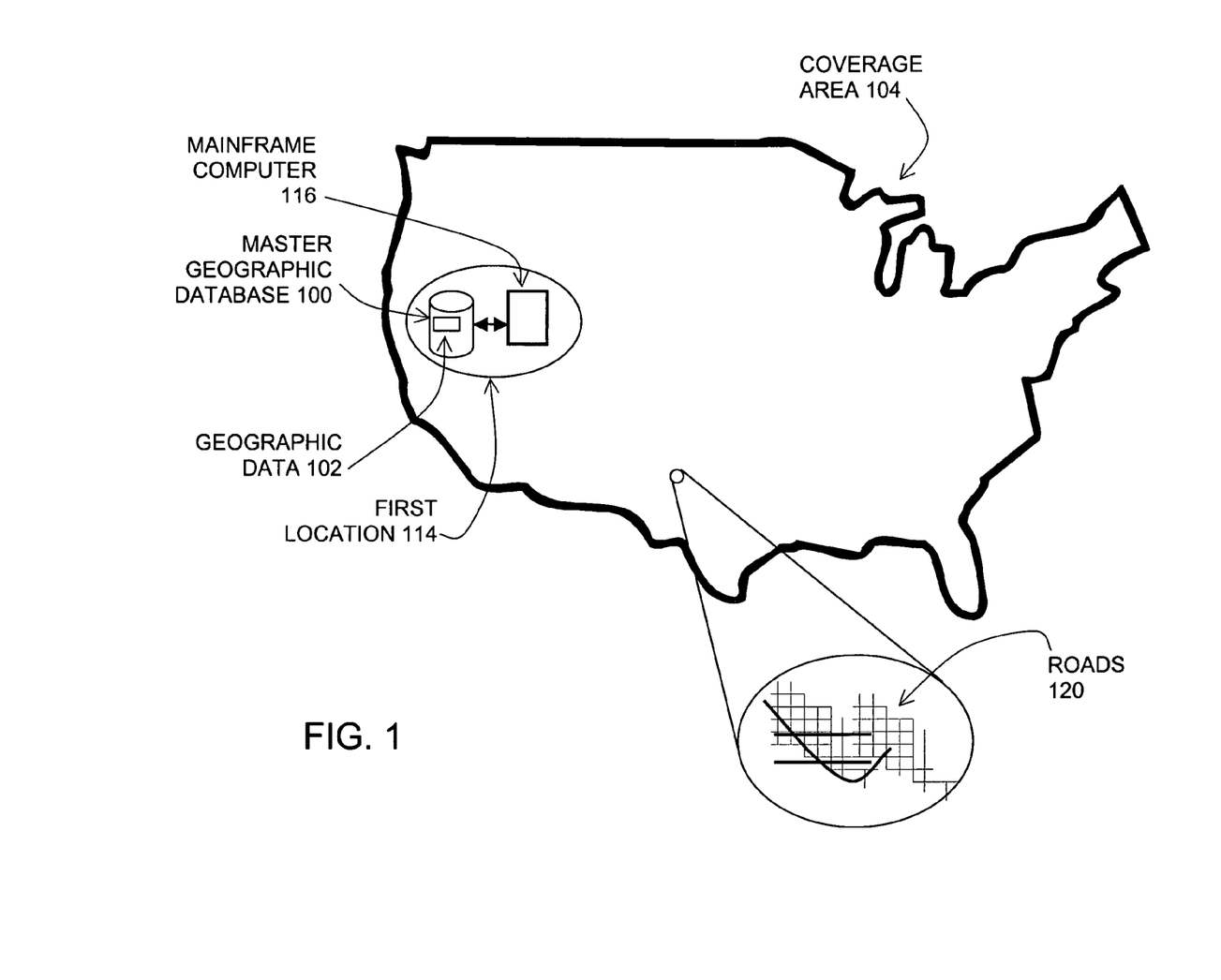
FIG. 1 is a diagram that illustrates a relationship between a master version of a geographic database and a coverage area.

FIG. 1 shows a master or source version of a geographic database 100. The master version of the geographic database is owned and developed by a geographic database developer 101 (also referred to as a "map developer", a "map data developer" or the like). (Although only one source database and geographic database developer are shown, the embodiments disclosed herein are not limited to only a single source database or a single geographic database developer.)

The master version of the geographic database 100 contains data 102 (also referred to a "geographic data" or "spatial data") that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, addresses ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities, and other geographic features, such as bodies of water, mountain ranges, etc. The master version of the geographic database 100 may include other kinds of information.

There are different ways used by the geographic database developer to collect data. These ways include obtaining data from other sources, such as municipalities. In addition, the geographic database developer may employ field personnel to travel by vehicle along roads throughout the geographic region to observe features and record information about them. The data collected by the geographic database developer are stored in the master version of the geographic database 100.

The geographic database developer 101 continues to collect data that represent the features in the geographic coverage area 104 on an ongoing basis. One reason that the geographic database developer continues to collect data is that the features in the coverage area 104 change over time. Accordingly, the geographic database developer collects data about the same features in order to update or confirm the previously collected data about the features. Another reason that the geographic database developer continues to collect data is to expand the coverage and/or detail of the master version of the geographic database 100. For example, at one point in time the master version of the geographic database 100 may include data that represents only a portion of the entire coverage area 104. After that point in time, the geographic database developer collects data about features in areas that were not previously represented in order to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the VSAM format and the GDF format, although other kinds of formats, both proprietary and non-proprietary, may be suitable. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

III. First Embodiment

Figure 2:
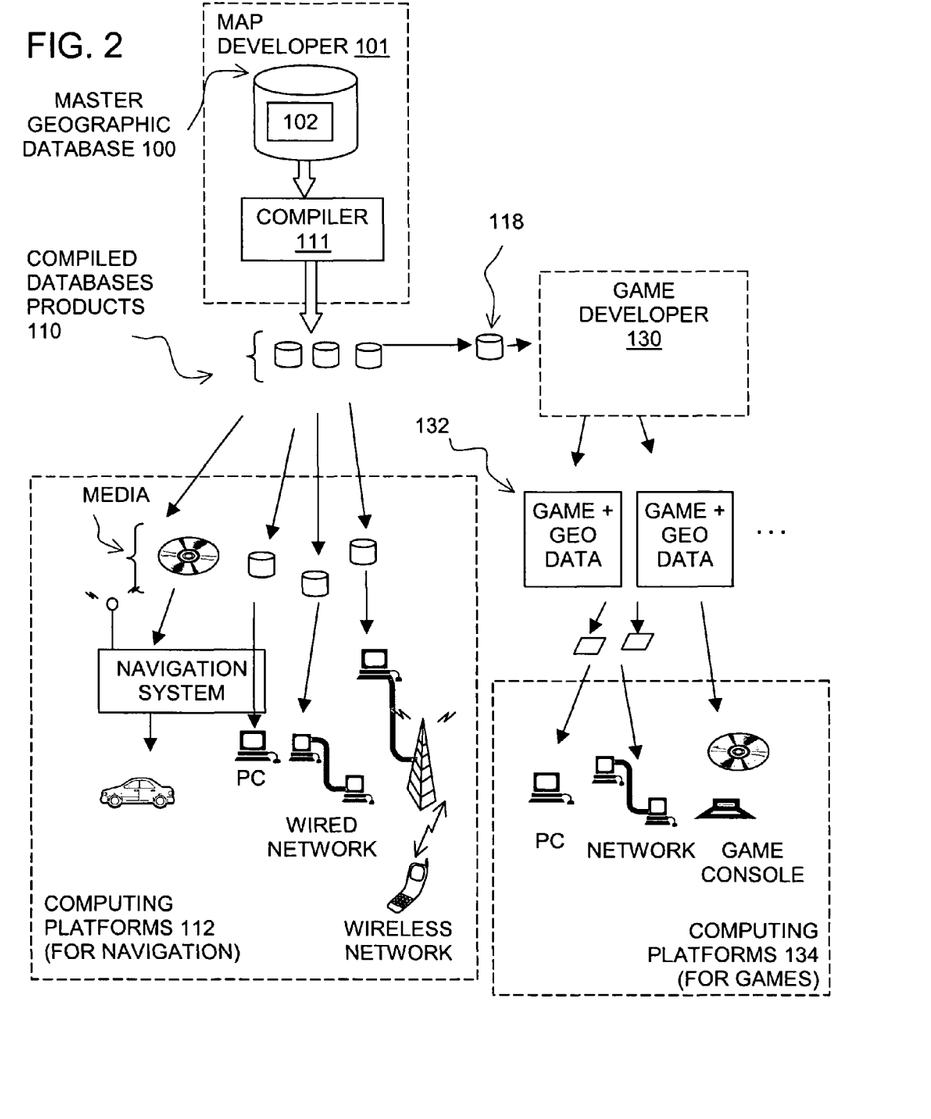
FIG. 2 is a block diagram showing a first embodiment of a system for facilitating use of geographic data in developing computer games.

FIG. 2 shows an overview of a first embodiment of a system and method for facilitating the development of computer games that include representations of actual geographic features, such as roads, in a geographic area. In FIG. 2, the master version of the geographic database 100 is used to make compiled database products 110. The compiled database products 110 are made using a compiler 111. The compiler 111 is a software program run on an appropriate computer platform.

The compiled database products 110 may include only portions of all the data in the master version of the geographic database 100. For example, the compiled database products 110 may include data that relate to only one or more specific sub-areas within the coverage area 104 of the master version of the geographic database 100. Further, the compiled database products 110 may include fewer than all the data attributes that describe geographic features represented in the master version of the geographic database 100.

The compiled database products 110 are used on various kinds of computing platforms. For example, the compiled database products 110 are used in computing platforms 112 used for navigation. The computing platforms 112 used for navigation include in-vehicle navigation systems, hand-held portable navigation systems, personal computers (including desktop and notebook computers), and other kinds of devices, such as personal digital assistant (PDA) devices, pagers, telephones, etc. The compiled database products 110 are also used on networked computing platforms and environments, including systems connected to the Internet.

The compiled database products 110 that are used in computing platforms used for navigation are stored on suitable media. For example, the compiled database products may be stored on a computer-readable medium (such as CD-ROM disks, hard drives, DVD disks, or flash memory) or other types of media that are available now or that become available in the future.

On the computing platforms 112 used for navigation, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

In addition to producing compiled database products for use on computing platforms used for navigation, the geographic database developer 101 produces one or more compiled database products 118 for use by a computer game developer 130. The compiled database product 118 used by the computer game developer may be the same or similar to a compiled database products 110 used in the computing platforms 112 used for navigation. The compiled database product 118 used by the computer game developer 130 may be provided on a suitable media, such as a computer-readable medium including one or more CD-ROM disks, DVD disks, or hard drives. Alternatively, the compiled database product 118 used by the computer game developer 130 may be provided over a network connection.

The computer game developer 130 uses data from the compiled geographic database 118, along with other data and components (as explained below), to create one or more computer games 132. The computer games 132 created by the computer game developer 130 may include some or all the data from the geographic database 118. Alternatively, the computer games 132 may include data derived from or based on the data from the geographic database 118. The geographic data in the computer game 132 may be in a different format than the data contained in the geographic database 118.

The computer games 132 created using the data from the geographic database 118 provide for representing geographic features in play scenarios of the computer games. The geographic features represented by the computer games include features located in some or all the coverage area of the geographic database 118, including some or all the road network represented by the geographic database 118. The computer games 132 are installed on appropriate computer platforms 134. The computer platforms 134 on which the computer games 132 are installed may include personal computers, game consoles, PDAs, handheld game devices, mobile phones, networked computers, and so on. Users access the computer games 132 on the computer platforms 134 to play the games.

Figure 3:
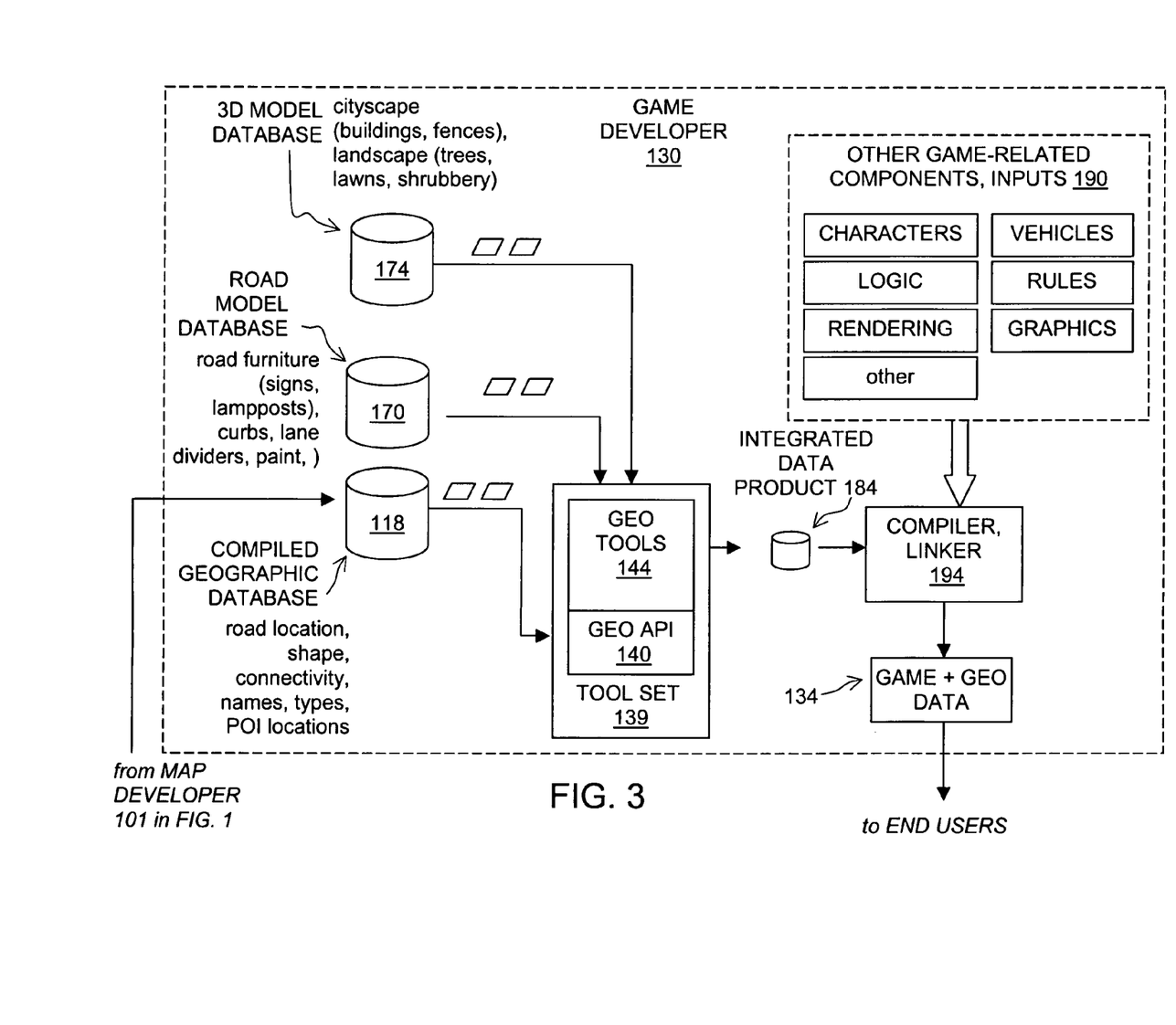
FIG. 3 is a block diagram showing components of a system used by the computer game developer of FIG. 2.

Referring to FIG. 3, the computer game developer 130 uses a tool set 139. In one embodiment, the tool set includes a geographic data API (application programming interface) 140 and geographic data tools 144 to access and use data contained in the compiled geographic database 118. In one embodiment, the geographic database API 140 and data tools 144 are similar or identical to the interface layer and related navigation applications described in U.S. Pat. Nos. 5,974,419, 5,953,722, 5,968,109 and 6,047,280, the entire disclosures of which are incorporated by reference herein. In general, the geographic data API 140 provides a library of functions that facilitate accessing the data contained in the compiled geographic database 118.

The geographic data API 140 and data tools 144 provide various ways that the data in the geographic database 118 can be accessed. Some of these ways the geographic data API 140 and data tools 144 provide for accessing the geographic database 118 include the following:

A. Spatial

Figure 4:
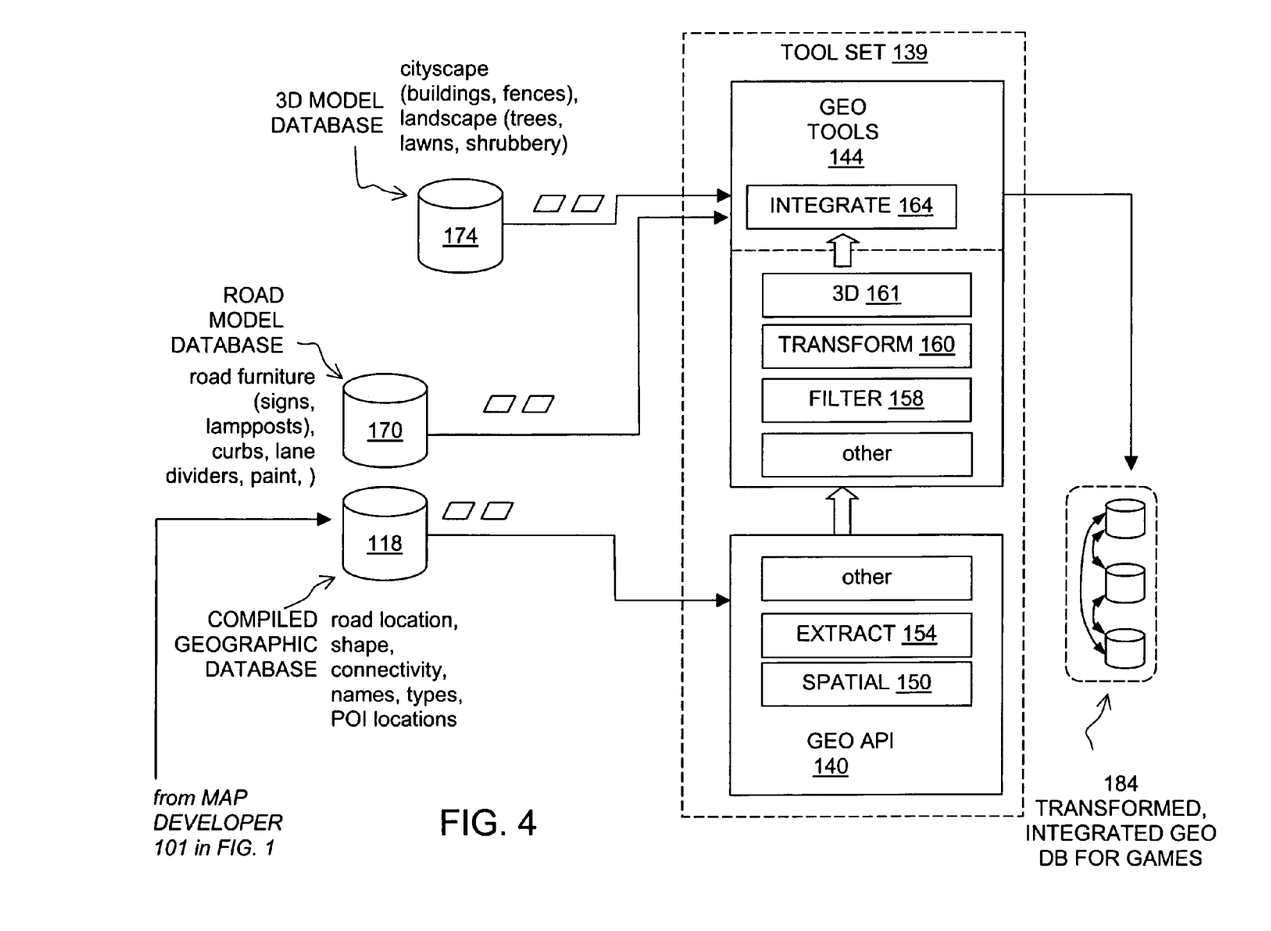
FIG. 4 is a block diagram showing components of the geographic API and geographic data tools programs of FIG. 3.

Referring to FIG. 4, among the functions provided by geographic data API 140 and data tools 144 is a spatial search function 150. The spatial search function 150 supports spatial queries. Spatial queries return data records of a specified type (e.g., data that represent road segments) based on location criteria included in the query. For example, a spatial query may request all the data records that represent road segments that are within 5 km of a given latitude and longitude. Another spatial query may request all the data records that represent restaurants that are within a rectangular area having specified geographic boundaries. The spatial search function 150 returns all the data records that meet these criteria.

B. Extraction (Slicing)

The geographic API 140 and data tools 144 provide an extraction function 154. The extraction function 154 supports extraction of slices of data from the geographic database 118. The game developer 130 may want to make a computer game that provides for representation of only a portion of the coverage area of the geographic database 118. As an example, the geographic database 118 may have a coverage area of Florida (i.e., includes data that represents the entire state of Florida); however, the game developer 130 wants to make a computer game in which a game player can virtually drive along only the streets of Miami. Using the extraction function 154, the game developer 130 can extract from the geographic database 118 the data that represents only the city of Miami.

C. Filter

The data in the geographic database 118 may be provided with a high level of detail and/or accuracy. For example, the data in the geographic database 118 may represent the locations of roads in a geographic region with a level accuracy of ±5 meters. This high level of detail is appropriate for navigation-related functions, such as vehicle positioning. However, providing a high level of detail requires a relatively large amount of data. For many computer games, a high level of detail may be unnecessary. Reducing the level of detail and/or accuracy reduces the amount of data needed to represent a geographic area. Furthermore, reducing the level of detail and/or accuracy may also facilitate processing of the data.

Accordingly, another function provided by the geographic API 140 and tools 144 is a filter function 158. The filter function 158 filters the geographic data obtained from the geographic database 118. The filter function 158 selectively eliminates portions of the geographic data obtained from the geographic database 118, while maintaining a given coverage area. According to one embodiment, the filter function 158 eliminates some of the data used to represent the shape of road segments (e.g., shape point data). The shape data are thinned out so that the entire road is still represented, but not necessarily with the same level of accuracy. For example, instead of representing a road with a level of accuracy of ±5 meters, the filter function 158 deletes shape point data so that the road is represented with a level of accuracy of ±25 meters. This reduction in accuracy results in a corresponding decrease in the amount of data needed to represent a geographic area. In another embodiment, the filter function 158 can be operated to eliminate entire classes of roads, such as all side streets.

Using the filter function 158, the game developer can obtain data from the geographic database that suitably represents a geographic area, without having more data than is needed to represent a geographic area with the desired level of detail and/or accuracy for purposes of the computer game. This may have a favorable effect on data storage requirements for the computer game and may improve game performance, i.e., so that the game is able to realistically simulate movement through the represented area at a desired simulated speed.

The filter function 158 may also be used by the game developer 130 to obtain geographic data at different levels of detail for games on different platforms. For example, a game developer 130 may use the filter function 158 to obtain geographic data with a relatively high level of accuracy for a console platform game, and use the filter function 158 to obtain another set of geographic data with a relatively low level of accuracy for a handheld platform game.

D. 3D Conversion

The geographic API 140 and data tools 144 also include a 3D conversion function 161. The 3D conversion function 161 supports conversion of the data obtained the geographic database 118 so that it can be displayed as a 3D (perspective view) image. The 3D image may represent the geographic area from the point of view of the game player or may be from the point of view of another, e.g., a spectator. The view may be an overhead view. (This 3D function may be incorporated here in the geographic API 140 and data tools 144 or may be incorporated into the other game-related components and inputs 190, described below.)

E. Transformation

The geographic API 140 and data tools 144 also include a transformation function 160. The transformation function 160 converts the data obtained the geographic database 118 into a different format. The different format may be one that is suitable for use by computer games. For example, the data may be transformed so that it is more suitable for 3D display. As another example, the data may be transformed so that it can be rendered quickly, i.e., to simulate a vehicle moving at high speed. According to another example, the data may be transformed so that it is more suitable for use with on-line games, e.g., Internet games.

F. Integration

The geographic API 140 and data tools 144 include an integration function 164. The integration function 164 provides for associating data obtained from the geographic database 118 with other, new types of data. Among the new types of data that are associated with the geographic data are road models and 3D models. The road models and 3D models are stored in a road model database 170 and a 3D model database 174, respectively.

The data in the road model database 170 are representations used for visual appearance and rendering of road-related things, such as road pavement, lane stripes, curbs, sidewalks, signs, lampposts, lane dividers, traffic signals, speed bumps, crosswalks, and so on. These road model representations are associated with data representation of the road network obtained from the geographic database 118. As stated above, the data in the geographic database 118 is (or is derived from) a representation of a road network used for navigation. As such, the data in the geographic database 118 may not indicate what roads, or things associated with a road, look like. For example, in the geographic database 118, a data representation of a road for navigation purposes may indicate the locations (e.g., geographic coordinates) of intersections, and possibly the locations of points along a road segment between intersections, the legal (and illegal) connections between roads, the names of roads, the addresses ranges along roads, the type of road surface, and so on. However, in the database 118 a data representation of a road for navigation purposes may not contain information that indicates the actual visual shapes, colors, dimensions, etc., of these road-related things. For example, in the database 118 a data representation of a road for navigation purposes may not indicate the colors of a road, curbs, sidewalks, what a sign looks like, and so on. The road model database 170 includes these types of information.

The integration function 164 provides for associating data in the road model database 170 with data from the geographic database 118 that represents the road network. The integration function 164 may associate road model data with specific locations along a road segment (as represented by data from the geographic database 118) or with lengths along a road segment. As an example, the integration function 164 may provide for showing curbs (using a model for what a curb looks like from the road model database 170) along all side streets (represented by data from the geographic database 118). In another example, the integration function 164 may provide for showing barriers along all the sides of expressways (using a model for barriers from the road model database 170) as represented by data from the geographic database 118. The integration function 164 may also provide for associating data models for traffic signals at intersections.

The data representations of road-related things in the road models database are also used for providing other properties of the represented things, such as the physical and audio properties. For example, causing a simulated vehicle to move over a simulated curb causes the simulated vehicle to "bump." Similarly, a simulated vehicle "hitting" a simulated lamppost causes a simulated crashing sound. The data representations from the road models database can also be used for providing feedback to the player via the user interface, if supported.

The road model database 170 may include a variety of different data models for some types of road-related things. For example, there may be a number of different types of traffic signal configurations. These different types of traffic signal configurations are used to provide variety and to make the representation of the road network appear more realistic, i.e., so that all the traffic signal configurations do not look the same.

The game developer uses the integration function 164 to combine data from the road model database 170 with data from the geographic database 118 to provide a realistic appearing and acting road network. The road model database 170 is not intended to represent the actual road-related things, such as the exact locations of or text on signs, or the exact configuration of traffic signals, etc. Neither the geographic database 118 nor the road model database may contain information that represents the actual location of signs or the exact configuration of traffic signals. However, the road model database 170 provides data for visually representing these road-related things in a manner that would be typical for the geographic area. So, for a residential neighborhood, the road model database would include models for sidewalks, cross walks, stop signs, etc., which would be associated with appropriate locations along the road network as defined by the geographic database 118. The integration function 164 and the road model database 170 provide for both the density (how many signs per mile or how many lampposts per block) and the style (shape, height, sign text wording) of these road related things.

As mentioned above, the integration function 164 associates data from the 3D model database 174 with the road network represented by the geographic database 118. The 3D model data in the 3D model database 174 includes representations used for visual appearance and rendering of cityscape- and landscape-related things, such as buildings fences, trees, shrubbery, lawns, fences, clouds, scenery, and so on. Like the road models, these 3D model representations are associated with locations along the road network data as represented by data from the geographic database 118.

The data representations of cityscape and landscape-related things in the 3D models database are also used for providing the other properties (e.g., physical and audio) of the represented things. For example, causing a simulated vehicle to strike a simulated building causes the simulated vehicle to stop and make a crashing sound. As another example, a simulated vehicle can drive over a simulated shrub, but not a simulated tree.

After the geographic database developer 130 has used the API 140 and geographic data tools 144 to extract, transform, filter, and integrate the data from the database 118 with the data from the road model database 170 and 3D model database 174, as appropriate, a data product 184 representing a geographic area and suitable for use in a computer game is produced.

Referring again to FIG. 3, the game developer 130 uses the data product 184 in a making a computer game 134. The game developer 130 combines the data product 184 produced using the API 140 and geographic tools 144 with other game-related components and inputs 190. Among the other game-related components and inputs 190 are data and programs that provide and/or represent characters, game logic, vehicles (both for the first person game player as well as others), and game rules. The other game-related components and inputs 190 also include programs for rendering and graphics. The other game-related components and inputs 190 may also include components (e.g., applications, programs, etc.) that make specific use of the geographic data, such as a route calculation application that determines a route that can be used as part of the play scenario of the game. The development of some computer games may include additional components and/or inputs whereas other computer games may require fewer. Creation and development of these game-related components and inputs are known to those of skill in the art. The game developer 130 combines the data product 184 produced using the API 140 and geographic tools 144 with the other game-related components and inputs 190 using a suitable linker and/or compiler 194. In the data product, the geographic data may be integrated into the code base or may exist separately. The computer game 134 produced by the computer game developer 130 is distributed (and/or sold or licensed) to end users using any suitable distribution channels.

IV. Second Embodiment

Figure 5:
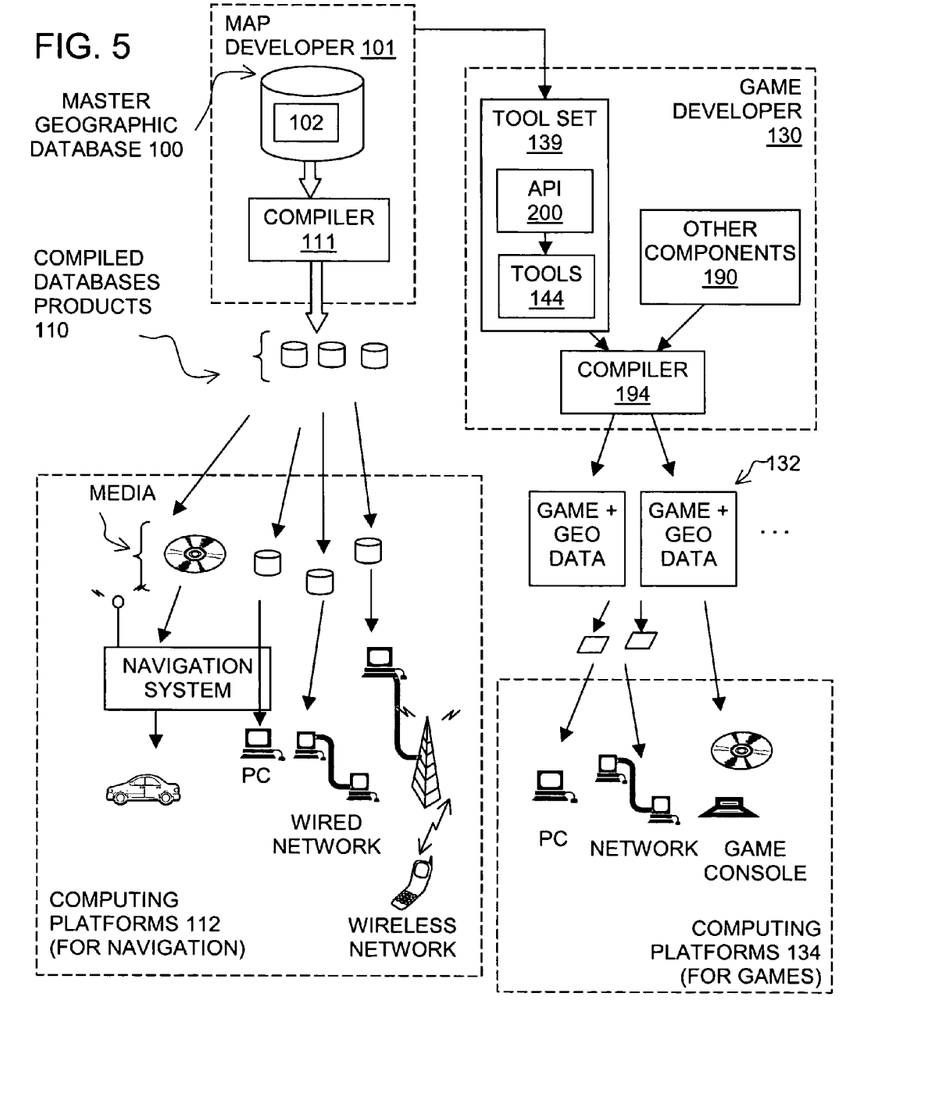
FIG. 5 is a block diagram showing another embodiment of a system for facilitating use of geographic data in developing computer games.

FIG. 5 shows another embodiment of a system and method for facilitating the development of computer games that include representations of actual geographic features, such as roads, in a geographic area. In FIG. 5, like components are indicated by the same numerals as in the previous embodiment. The system and method of FIG. 5 are similar to the system and method of FIG. 2 with the exception that the game developer 130 receives geographic data from the master geographic database 100 instead of from one of the compiled geographic databases 110, 118 produced from the master geographic database 100. In order to access data from the master geographic database 100, the game developer 130 uses an interface 200. The interface 200 is different from the API 140 (in FIG. 4) insofar as it provides for accessing geographic data in the uncompressed format in which it is stored in the master geographic database 100. This may affect the performance of the interface 200. However, this may not be a significant factor in a development environment. In other respects, the embodiment of FIG. 5 is similar to the embodiment of FIGS. 2-4.

V. Third Embodiment

Figure 6:
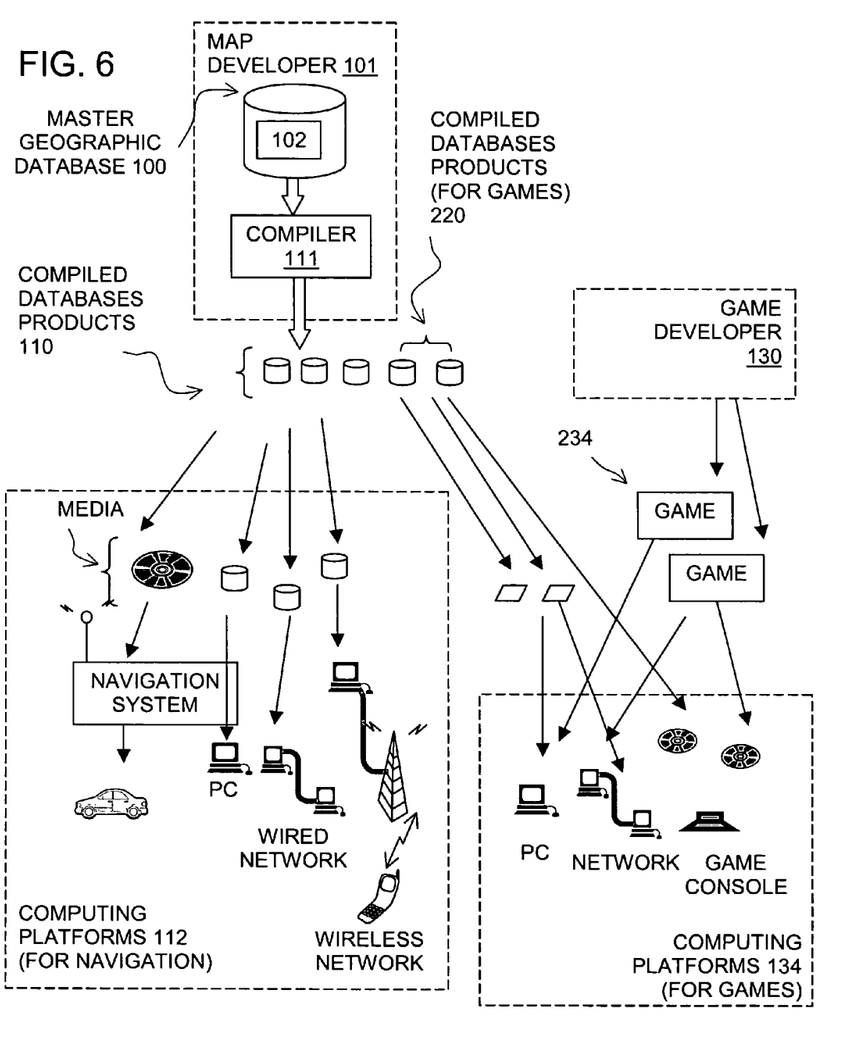
FIG. 6 is a block diagram showing still another embodiment of a system for facilitating use of geographic data in developing computer games.
Figure 7:
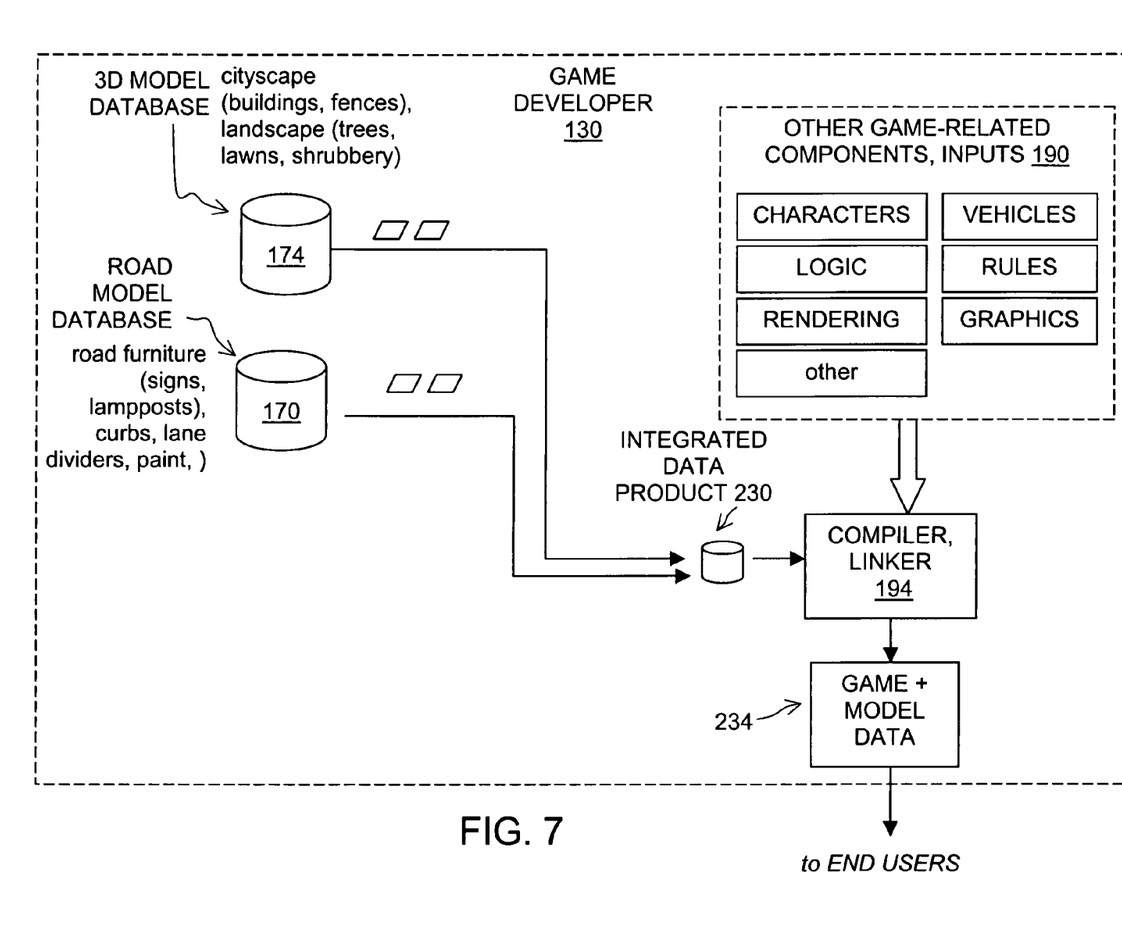
FIG. 7 is a block diagram showing components of a system used by the computer game developer of FIG. 6.

FIG. 6 shows another embodiment of a system and method for facilitating the development of computer games that include representations of actual geographic features, such as roads, in a geographic area. In FIG. 7, like components are indicated by the same numerals as in the previous embodiment. The system and method of FIG. 7 are similar to the system and method of FIG. 2 with the exception that the map developer 101 provides compiled geographic database products 220 which are suitable for use in computer platforms for games 134. These compiled geographic database products 220 are then distributed to end users who use the compiled geographic database products 220 in their computing platforms for games 134. The compiled geographic database products 220 may be distributed directly from the map developer 101 to the end users or alternatively, the compiled geographic database products 220 may be distributed through the computer game developer 130 or another third party.

In this embodiment, the computer game developer 130 develops computer games 234 that use the separately provided geographic database products 220. FIG. 7 is a block diagram showing components of this embodiment. The components shown in FIG. 7 are similar to those in FIG. 4 with the exception that the computer game developer 130 does not include the geographic data from the map developer 101 in the game. Instead, the computer game developer 130 provides data from the road model database 170 and the 3D model database 174 along with the other game-related components and inputs 190 in a game 234. The game 234 is created in a way that it accesses a compiled geographic database 220 on the end user's computer platform 134. The end user's game platform 134 includes an appropriate API (which may be similar to the API 140 described in connection with FIG. 3). An advantage of this embodiment is that end users may be able to obtain different compiled databases, representing different geographic areas, from the map developer 101.

VI. Other Embodiments

The embodiments disclosed herein describe use of geographic data in computer games. The embodiments disclosed herein can be adapted for using geographic data for other non-navigation-related purposes. Among these other, non-navigation purposes are simulations and movie making. For example, the embodiments disclosed herein can be adapted for using geographic data for simulation systems. Simulation systems that can use geographic data include systems that simulate emergency operations (such as evacuation procedures or emergency vehicle deployment and routing), driver education systems, etc.

The embodiments disclosed herein can also be used in movie making. Many movies use computer-generated images of real (or imaginary) locations, instead of actual images. The embodiments disclosed herein can be adapted for creating realistic-looking geographic locations, including features such as road networks, for use in movie making. When using any of the disclosed embodiments for movie making, a relatively high visual accuracy may be required and therefore attributes that provide for relatively high visual accuracy may be needed. However, fewer attributes of some types may not be required.

The embodiments disclosed herein can be used on various different types of computer platforms, including client-server platforms and peer-to-peer platforms. The embodiments disclosed herein can be used with streaming or other technologies.

The embodiments disclosed herein may also be used for games that use geographic data obtained from multiple sources, e.g., more than one source geographic database. In these embodiments, the data from the multiple source geographic databases may be combined by the game developer or by another party.

VII. Examples

The following are examples of different types of computer games and/or applications that can be developed using the disclosed embodiments. (Note that some of the games are new and some are updates and/or improvements of prior games.)

A. City Development Simulation Game

Geographic data that represents actual, real-world locales can be used in a type of computer game in which players simulate growth of an urban (or other regional) environment. In this kind of game, players simulate building cities or other places (such as towns, countries, rural areas) by designing roads, utilities (e.g., electrical, sewage, water) and other infrastructure elements for a geographic area. Then, the computer game allows a virtual city to develop based on the designs. The virtual cities can be detailed including individual zoning requirements (e.g., residential, commercial, industrial, etc.), crime layers (i.e., that can be changed by implementing police stations), traffic, unemployment and other realistic features.

Geographic data that represents actual, real-world locales can be used in this type of game to provide a high level of realism thereby allowing game players to build cities based on real world city models. In this type of game, players may choose a specific city model (e.g., Paris), and attempt to improve or replicate it. The inclusion of real time traffic, weather, points of interest (periodically updated or real time) and other real world content would serve to increase the realism of such a virtual city. This improvement could add realism, player loyalty, recognition, and an alternative goal to this popular type of game.

B. Virtual Person Development Simulation Game

Geographic data that represents actual, real-world locales can be used in a type of computer game in which game players simulate development of a virtual person (e.g., a "sim"). In this kind of computer game, players build a virtual person by managing that virtual person's habits, tendencies, house, family, job and interactions with other virtual people. In prior simulation games of this type, the locales in which virtual people live were non-specific. In prior simulation games of this type, the locales were modeled from the view of the player's virtual house and may have included some features specific to the game manufacturer.

Data from a source of geographic data that represents actual, real-world locales can be used in this type of game to provide a high level of realism, thereby allowing players to build virtual characters in models of real cities, with models of actual real-world points of interest, streets, landmarks and neighborhoods. When starting this type of game, which has been enhanced by the addition of geographic data that represents actual, real-world locales, a player chooses a real world city. Once the city has been chosen, neighborhoods from the city become available for the player to select (e.g., Chicago's Gold Cost, Lincoln Park, Rogers Park, River North, or specific suburbs). Once the player selects a neighborhood, the player's virtual person would be able to simulate visits to virtual attractions based on real world local attractions, e.g., go to popular restaurants and bars, work in local businesses, and reflect how life is lived in that specific area almost as if he/she were living there.

C. "Bot-Fighter" Game

Geographic data that represents actual, real-world locales can be used as a backbone for a "bot-fighter"-type game. This enhances the bot-fighter-type game by incorporating detailed spatial data that represents real world locales. A "bot-fighter"-type game can be played on mobile phones. In this game, players build "warrior robots" on their mobile phones using credits (e.g., virtual money) from battles won against other players. All firing between warriors is done via SMS messaging over the mobile phones. With mobile phone technology, a player may be given rough coordinates to his or her player-enemies or be warned when a player-enemy has entered his/her area or turf via mobile phone positioning technology.

The addition of geographic data that represents actual, real-world locales can give this type of game greater appeal. Specific route data and location details or spotting could be provided instead of simple proximity alerts. The addition of geographic data that represents actual, real-world locales would enable this type of game to support more precise boundaries. Further, with the addition of geographic data that represents actual, real-world locales, a game player's weapons could be given more accurate range limitations, rather than rough limitations available with existing games.

In addition, game credits (e.g., virtual money) could be spent on routes, enemy interception (based on known movements or historical patterns) courses, or enemy spotting locations.

D. Traffic Management Game/Application

In this computer game/application, data that represents the road network in the real world is used in combination with traffic feeds and models in order to simulate a real city with its existing traffic patterns. Once a model of an actual city with its road network and traffic patterns is created, predictive modeling and comparisons to other cities allow the user to tweak, re-model, or re-design traffic architecture to improve the road network with the objective to create the most efficient traffic system or to make the most improvements to an existing system.

This computer game/application can include a vehicle fleet management feature. According to this feature, the game player is given a virtual fleet of vehicles (e.g., starting with two trucks) in an initially chosen city and an overlay of existing traffic conditions. The goal of the game with the fleet management feature would be to provide service to a customer base (i.e., based on real world businesses represented in the real world geographic database and some zoning data). Time of day for delivery, fleet routing, fuel expenditures, pickup points and schedules etc., would all be managed by the game player.

Traffic flow, incidents, bottlenecks and other traffic data would be displayed. Wired or live devices would also have the ability to add live or updated data. Traffic would be made up from individual vehicles, following typical vehicle movement patterns (e.g., gapers, cars driving down the shoulder, etc.) or could be built from scratch.

E. Emergency Services and Law Enforcement Games

Geographic data that represents actual, real-world locales can be used in emergency services scenario-type games or law enforcement scenario-type games. These games include themes related to fire fighting, medical emergency services (e.g., ambulance, search and rescue), police chases, etc. Game developers who make these kinds of games can use the disclosed embodiments to provide realistic looking locales, possibly with the addition of location-based content (e.g., actual buildings, businesses etc.), traffic, weather, points of interest, etc., as part of the playing scenarios of these games.

F. Location Quiz Game

Geographic data that represents actual, real-world locales can be used in a location quiz-type of computer game. In this type of game, game players are provided with clues about a game character's secret location and attempt to determine the secret geographic location. Using geographic data that represents actual, real-world locales adds a measure of realism to this type of game and increases its educational value.

One feature of this game is the ability to personalize the game to a player's locale. Players would be able to search for the secret location in their own city or neighborhood. For example, parents could use the game to teach their children how to get around in their own neighborhoods. According to this example, parents could set up the game to include the route that their child takes to and from school. Also, if a family moves to a new neighborhood, the parents could obtain up-to-date digital map data that represents the new neighborhood in order to teach their children about the new neighborhood.

Adding digital map data to the game would also provide the capability to play it anywhere the player is located. For example, a child from Chicago who is on vacation in Paris could search for the game character in Paris and thereby learn about the city.

G. Children's Atlas

Another computer game/application that can use geographic data that represents actual, real-world locales is a children's atlas game/application. This computer game/application can be used by families on long car trips. In one embodiment, this game/application could be used to answer children's questions such as "Are we there yet?" or "Where are we?" with distances and times to destinations.

One version of this game includes a communications feature that allows a child to communicate with other children who have games with the same feature. Another version of this game/application allows a game player to create a virtual travelogue that describes and records travels in real time.

In one embodiment, a children's atlas game/application would be developed as a travel companion game that obtains location information from an in-vehicle navigation system or remote server. As a car in which the child is a passenger drives through a specific locale (e.g., a town or attraction) or a more general area (e.g., a state), the children's atlas application would display images and use voice narration to provide facts about the area. The children's atlas game/application would also provide well-known stories or legends about an area (e.g., Johnny Appleseed as the child is traveling through the Appalachians).

In another alternative embodiment, the children's atlas includes a travel pal feature. This feature allows a child traveling through an area to connect online with other children who located in the area. In one version of this feature, children can communicate with other traveling children or with other children located in the area a child is passing through using instant messaging. A buddy list may be formed and used for this purpose. Children could access this service while traveling or at home. For example, children could exchange information about their travels or play games. Children passing through a particular place could instant message with children living in the area and ask questions about the area, e.g., what do the locals think about the best places to eat, what is the best radio station, etc.

According to another alternative embodiment, the children's atlas application includes a virtual travelogue feature. The virtual travelogue feature allows a child to collect, store, and send information about his or her travels as a trip is taking place. The child could take information provided by the atlas game/application, annotate it with personal experiences and observations, and send it to friends and relatives, or to a home website that eventually turns into a scrapbook of the entire trip (or perhaps a report on a school field trip), complete with maps, pictures and postcards from the area, voice narration, and any other data collected along the way.

The virtual travelogue feature could also catalogue and automatically store every place the child has traveled. The child could then display or print out a map that shows all the places he or she has been and how he or she got there.

H. Simulated Tour

Another application that can use geographic data that represents actual, real-world locales is a simulated tour application. This simulated tour application uses geographic data, POI data, 3D modeling, and other data, such as weather, traffic, crime statistics, and restaurant guides, to build a realistic view of a city or other locale for virtual touring. The simulated tour application could be used by people considering moving to a new area, or could be hosted by realtors, or used by travelers, or simply used by individuals to learn more about different locations.

With this application, one can learn, understand, explore, or market a specific area. This application would portray an area visually, textually, and possibly even audibly. Smells (e.g., heavy fog, chocolate factory nearby—pervasive) could be provided using appropriate technology or described textually.

One use for this application is to provide a way for a person to become familiar with driving in an unfamiliar city. Some cities may have driving conventions that are unfamiliar to some people. For example, speed limits are painted on the road in California and Hawaii whereas they are located on little signs in Illinois. According to another example, traffic is particularly aggressive in Rome and lanes are viewed as guidelines, not rules etc.

I. Car Rally Challenge Game

Another computer game that can be improved using geographic data that represents real world places is a car rally challenge-type game. This game can be played in single player or multi-player versions. In this type of game, teams of game players travel actual routes that are sent to them from a central server. The server would store a number of car rally routes and attribute scenarios (e.g., points of interest as checkpoints) for a specific area (e.g., state, city, neighborhood, etc.), and these virtual rally instructions would be sent to the participating drivers and navigators.

An organizer's kit could also be offered that would cater to amateur car rally organizations or clubs. The kit would allow an individual or organization to create a customized car rally specific to a city or area. The rally information could be created on the rally organizer's personal computer within a program, or via download from a website. It could then be printed out and handed to the racers or downloaded to a device such as a PDA.

The difference between the game and the kit is that the game would send out pre-determined routes and rally features. The routes and features might change regularly but the players would not have a hand in planning or creating the rally scenarios. The kit would provide the basic tools and content to create a rally, thereby allowing the user to add local flavor, degrees of difficulty, or to even recreate a well-known rally course.

J. Location-Based Virtual Monopoly Game

Geographic data that represents real world places can be used in a computer game based on the Monopoly board game. In one version of this game scenario, a game player's positions and movements in the real world are tracked, using positioning equipment such as GPS, cell phone triangulation, etc. These movements would be used to define game routes for that player. Then, the routes would be used to identify properties (e.g., actual or fictional) along that route the game player could virtually purchase, rent, etc., as in the classic board game. Real world conditions, such as traffic restrictions, road construction, tolls, etc., would be factored into the game play scenario.

K. Promotional Games and Contests

Geographic data that represents real world places can be used for promotional concepts (e.g., contests, sales events, and so on). Businesses, such as retailers or restaurant franchises, frequently use special promotions or contests to attract business. Adding location-based data and services to these promotions would allow businesses to better target, reach, and track potential customers, and also add an extra dimension. Promotional tie-ins to location-based data could be developed using a variety of approaches.

L. Spatial Simulator for Exercise

Data that represents actual, real world places can be used with sports or exercise-related events or equipment. For example, geographic data can be used to enhance simulators (e.g., monitors) used on or with exercise equipment. Geographic data that represents real places can be used with a treadmill or exercise bicycle to simulate the experience of running or biking along a route. The route would be projected on a monitor or screen in front of the person on an exercise machine such as a treadmill or exercise bicycle.

Use of data that represents actual, real world places could allow users to feel as if they were running through the streets of a major city, e.g., along a marathon or 10K route, or biking the route of the Tour de France. The simulator could also be used to keep track of long-term training goals, such as running virtually across the entire United States.

A basic simulation would consist of a display of a basic overview map based on a route. For example, the user would ask for a route within a city and a basic map would be displayed showing the streets of the city with a mark on the map indicating the virtual position of the runner or bicyclist. The runner's progress along the route would be based on the runner's pace. The degree or category of simulation offered could vary depending on the level of realism desired. For example, details such as road elevation could be added to the simulation. This would allow the person exercising to experience the feeling of running or biking in the Rocky Mountains or through the plains of Nebraska.

A detailed simulation would use 3D data and give a full picture on a monitor of the buildings and landmarks along the route. This would give the runner or bicyclist a realistic feeling of running or biking along the route.

M. Classic Computer Games

Geographic data that represents actual, real-world locales can be advantageously used to make new versions of classic computer games like Snake and Pacman. In these new versions of these games, game players assume the identities of characters in the game. A player uses positioning equipment that determines the player's actual physical positioning the real world. The player also has equipment that provides for wireless communication with a central database. This player becomes a virtual player in a classic game such as PacMan or Snake. The games would be played in either an online competitive mode or a single player (player versus machine) mode. In either case, the player acts as a character in the game. The distance and speed moved by the player would be translated to movement and speed in a virtual world, where the player may accomplish goals within the game or defeat other players. The system would be set up in translated "virtual boards" where a game would consist of an area regulated by the speed of transportation (a "board" for a vehicle can be significantly larger than one for a pedestrian).

N. Location Based Cannonball Run Car Racing Game

Another computer game that can use embodiments of the disclosed system and method for providing geographic data is a "cannonball run" car racing game. This game may be played in multi-player or single player mode. The multi-player mode game may be played online. In the game playing scenario, players compete against each other to race vehicles (e.g., cars, bikes, etc.) across a geographical area. Data that represent actual, real-world places would be used to add realism to the game, e.g., actual legal and physical restrictions. Alternative features include the addition of real-time traffic and weather conditions.

One scenario for a multi-player online version of the game would feature a community where players start out with a specific mode of transportation. This version of the game would provide an online culture and goal of being with the best group and driving the best vehicle. Players would start with a certain amount of virtual cash and a basic vehicle. Some races would be pre-defined events, whereas other races would be random city races with a user defined start and end points. The selection of routes for races would be based on real map data. The game would be based on winning virtual money by winning races, but winning a race could cost the player due to traffic tickets, illegal traffic maneuvers or other expenses. All fines would be based on legal restriction data and statistics of the percentage of drivers caught. Suggested routes would be provided in all races, and the amount of virtual cash used to buy a route would vary the quality or speed of the route.

Game players would have the option of racing through their hometowns, or through the streets of their favorite cities or countries all over the world. These would attract a larger demographic, and interest the casual game player as well.

O. Virtual Trip Planner and Simulation

Data that represents actual, real world places can be used for a computer simulation application that would allow a user to preview a trip or specific route by virtually driving it on his or her personal computer or game console. The simulation would be based on a representation of the geographic database that included 3D renderings of buildings, signs, topographical features, and other related attributes. The simulation software could be provided on media, through an online vendor, or rented to users on an as-needed basis. Users would enter a route request via their personal computers or consoles and could use gaming steering wheels, joysticks, voice commands, or keyboards to drive the routes. A fast forward function could be used to skip the obvious or mundane sections of the trip or to speed up the pace.

To make the simulation more realistic, traffic features, such as vehicles coming and going on the route, could be included. These could perhaps even be based on actual traffic patterns or real-time traffic for a selected time of day.

A feature of this simulation application would be as a form of trip planner. The planner would provide information about an area to which one is traveling, such as local history, area specific trivia games, and point of interest descriptions and recommendations. Users would have the option of using this information while driving the area in advance (e.g., using the simulation application, described above), printing out the planner in advance as a reference, or loading it onto a device and accessing it during an actual trip (e.g., going on a long trip and using the planner interactively to keep children amused and informed). For example, if a family was traveling on vacation from Chicago to Miami by car, the parents could research and preview the attractions, hotels, and restaurants at which the family may want to stop along the way. They could also preview the route and create their own form of trip ticket to plan the best route. The parents could then set up an itinerary that would include games, information, quizzes etc., that would occupy the children throughout the trip.

It is intended that the foregoing detailed description be regarded as illustrative rather than limiting and that it is understood that the following claims including all equivalents are intended to define the scope of the invention.

We claim:

1. A computer implemented method for deriving at least two products from a source geographic database, the source geographic database comprising data representing real-world geographic road features including geographic coordinates of positions of roads, street names of the roads, address ranges along the roads, turn restrictions at intersections of the roads, road connectivity, and road shape, wherein the at least two products comprise a first dataset and a second dataset, the second dataset provided to depict a real geographic locale as part of a play scenario for a computer game, the method comprising:

extracting the first dataset from the source geographic database;

writing the first dataset to a first computer-readable medium;

providing the first dataset, wherein at least a portion of the first dataset is used in a real-world navigation system;

extracting the second dataset from the source geographic database;

writing the second dataset to a second computer-readable medium; and providing at least a portion of the second dataset to each of a plurality of end-user computing platforms, wherein each of the plurality of end-user computing platforms uses at least a portion of the second dataset in the respective computer game to depict the real geographic locale as part of the play scenario of the computer game, the play scenario including a predetermined theme that governs game play of the computer game in a preset storyline, wherein the play scenario corresponds to a virtual position for display on a user interface in which the virtual position is independent of a user's actual physical location.

2. The method of claim 1 wherein the real-world navigation system is selected from a group consisting of: in-vehicle navigation systems, hand-held portable navigation systems, personal computers, personal digital assistants, pagers, and telephones.

3. The method of claim 1 wherein using at least a portion of the first dataset in a real-world navigation system comprises providing a service selected from a set consisting of: route calculation, route guidance, vehicle positioning, map display, and electronic yellow pages.

4. The method of claim 1 further comprising:
combining at least a portion of the second dataset with a road-model dataset to provide a realistic visual appearance of roads,
wherein the road-model dataset is separate from the source geographic database.

5. The method of claim 4 wherein the road-model dataset comprises a feature selected from a set consisting of: road-pavement colors, lane-stripe markings, curbs, sidewalks, signs, lampposts, land dividers, traffic signals, speed bumps, and crosswalks.

6. The method of claim 1 further comprising:
combining at least a portion of the second dataset with a 3D-model dataset to provide a realistic visual representation of a feature selected from a set consisting of: polygon-shaped features, cityscape features, landscape features, buildings, fences, trees, shrubbery, lawns, and clouds,
wherein the 3D-model dataset is separate from the source geographic database.

7. The method of claim 1 further comprising:
combining at least a portion of the second dataset with a computer-game component selected from a set consisting of: characters, game logic, vehicles, games rules, rendering logic, and graphics logic.

8. The method of claim 1 further comprising:
accessing the second dataset using an application programming interface.

9. The method of claim 1 further comprising:
accessing the second dataset using a spatial query.

10. The method of claim 1 further comprising:
extracting data from the second dataset using spatial criteria.

11. The method of claim 1 further comprising:
filtering data from the second dataset to provide a desired level of accuracy.

12. A non-transitory computer-readable medium having computer-executable instructions stored thereon for performing a method of using a source geographic database, the source geographic database comprising data representing real-world geographic road features including geographic coordinates of positions of roads, street names of the roads, address ranges along the roads, turn restrictions at intersections of the roads, road connectivity, and road shape, the method comprising:

extracting a first dataset from the source geographic database;

writing the first dataset to a first computer-readable medium;

providing the first dataset to supply a navigation-related function in a real-world navigation system;

extracting a second dataset from the source geographic database;

writing the second dataset to a second computer-readable medium; and providing the second dataset and a geographic data tool set to each of a plurality of end-user computing platforms to develop a computer-game that depicts a real geographic locale as part of a play scenario having a preset storyline, wherein each of the plurality of end-user computing platforms uses at least a portion of the second dataset in the respective computer game to depict the real geographic locale as part of the play scenario of the computer game, wherein the play scenario corresponds to a virtual position for display on a user interface in which the virtual position is independent of a user's actual physical location, wherein the geographic data tool set is configured to extract data representing all road segments corresponding to a sub-area from the second dataset based on a location input.

13. The non-transitory computer-readable medium of claim 12, wherein the sub-area comprises a city, and wherein the location input includes identification of the city.

14. A computer implemented method of using a source database for forming derived products, wherein the source database contains data that represent real-world geographic road features including geographic coordinates of positions of roads, street names of the roads, address ranges along the roads, turn restrictions at intersections of the roads, road connectivity, and road shape, the method comprising:

providing a first set of data from the source database to a first developer, the first set of data stored in a first computer-readable medium, wherein the first developer uses the first set of data in systems that provide navigation-related features, wherein the first set of data represents at least some of the real-world geographic road features and further wherein the first set of data includes attributes configured to provide navigation-related functions; and providing a second set of data from the source database and a geographic data tool set to a plurality of end user computing platforms that use the second set of data in computer games installed on the end user computing platforms, the second set of data stored in a second computer-readable medium, wherein the end user computing platforms use the second set of data and the geographic data tool set to develop the computer games, wherein the second set of data represents at least some of the real-world geographic road features as part of play scenarios of the computer games including respective preset storylines, wherein a respective play scenario corresponds to a virtual position for display on a respective user interface in which the virtual position is independent of a respective user's actual physical location, wherein the geographic data tool set provides a spatial search function that retrieves data representing all road segments in a sub-area from the second set of data based on a location specific query that identifies the sub-area.

15. The method of claim 14 wherein the second set of data is combined with road model data to provide a realistic visual appearance of roads in the region.

16. The method of claim 14 wherein the second set of data is combined with road model data to provide a realistic visual appearance of roads in the region, wherein the road model data includes road pavement colors, lane stripe markings, curbs, sidewalks, signs, lampposts, lane dividers, traffic signals, speed bumps, and crosswalks.

17. The method of claim 14 wherein the second set of data is combined with 3D model data to provide a realistic visual representation of polygon-shaped features in the region.

18. The method of claim 14 wherein the second set of data is combined with 3D model data to provide a realistic visual representation of cityscape and landscape features in the region.

19. The method of claim 14 wherein the second set of data is combined with 3D model data to provide a realistic visual representation of one of a group consisting of: buildings, fences, trees, shrubbery, lawns, fences, and clouds in the region.

20. The method of claim 14 wherein the second set of data is accessed by an application programming interface that is included in the geographic data tool set.

21. The method of claim 14 wherein data from the second set of data is filtered to provide a desired level of accuracy in a second database product.

22. The method of claim 14 wherein the second set of data is combined with other game-related components to form the computer games.

23. The method of claim 14 wherein the second set of data is combined with other game-related components to form the computer games, wherein the other game-related components include at least one of a group consisting of: characters, game logic, vehicles, game rules and programs for rendering and graphics.

24. A computer implemented method of using a source geographic database, the source geographic database comprising data representing real-world geographic road features including geographic coordinates of positions of roads, street names of the roads, address ranges along the roads, turn restrictions at intersections of the roads, road connectivity, and road shape, the method comprising:

extracting a first dataset from the source geographic database;

writing the first dataset to a first computer-readable medium;

providing the first dataset to supply a navigation-related function in a real-world navigation system;

extracting a second dataset from the source geographic database;

writing the second dataset to a second computer-readable medium; and providing the second dataset and a geographic data tool set to each of a plurality of end-user computing platforms to develop a computer-game that depicts a real geographic locale as part of a play scenario of a preset storyline, wherein each of the plurality of end-user computing platforms uses at least a portion of the second dataset in the respective computer game to depict the real geographic locale as part of the play scenario of the computer game, wherein the play scenario corresponds to a virtual position for display on a user interface in which the virtual position is independent of a user's actual physical location, wherein the geographic data tool set is configured to request data representing road segments within a selected area from the second dataset as a function of a spatial query, the spatial query defining the selected area, and wherein the selected area is defined by a longitude and latitude point and a radial distance from the longitude and latitude point.

25. A computer implemented method of facilitating development of computer games, the method comprising:

extracting a dataset from a source geographic database, wherein the source geographic database includes data that represent roads in a road network in a real world geographic locale including
(i) geographic coordinates of positions of the roads,
(ii) street names of the roads,
(iii) address ranges along the roads,
(iv) turn restrictions at intersections of the roads,
(v) road connectivity, and
(vi) road shape;

writing the dataset to a computer-readable medium; and providing the dataset and a geographic data tool set to each of a plurality of end-user computing platforms to develop a computer-game that depicts the roads in the real world geographic locale as part of a play scenario of the computer game including a preset storyline, wherein each of the plurality of end-user computing platforms uses at least a portion of the dataset in the respective computer game to depict the real world geographic locale as part of the play scenario of the computer game, wherein the play scenario corresponds to a virtual position for display on a user interface in which the virtual position is independent of a user's actual physical location, wherein the geographic data tool set is configured to request data representing road segments within a selected area from the dataset as a function of a spatial query, the spatial query defining the selected area.

26. The method of claim 25, wherein the selected area is defined by a longitude and latitude point and a radial distance from the longitude and latitude point.

27. The method of claim 25, wherein the selected area is defined by a rectangular area having specified geographic boundaries.

28. The method of claim 25, wherein the computer game is a type selected from a group consisting of: a car chase game and a "bot" fighter game.

* * * * *